United States Patent Office 3,539,752
Patented Nov. 10, 1970

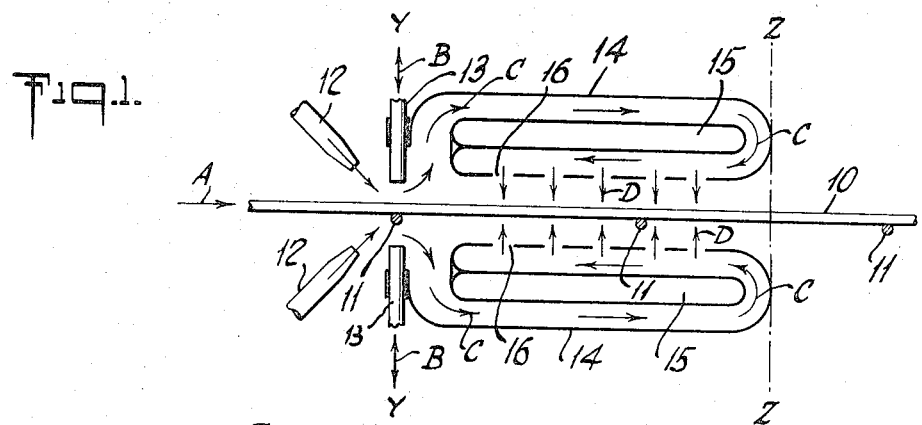
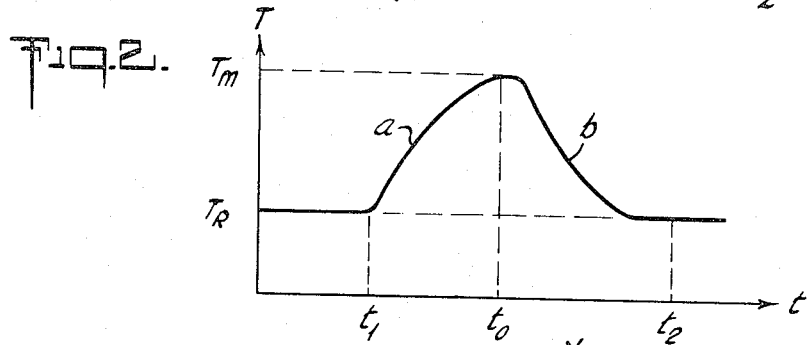
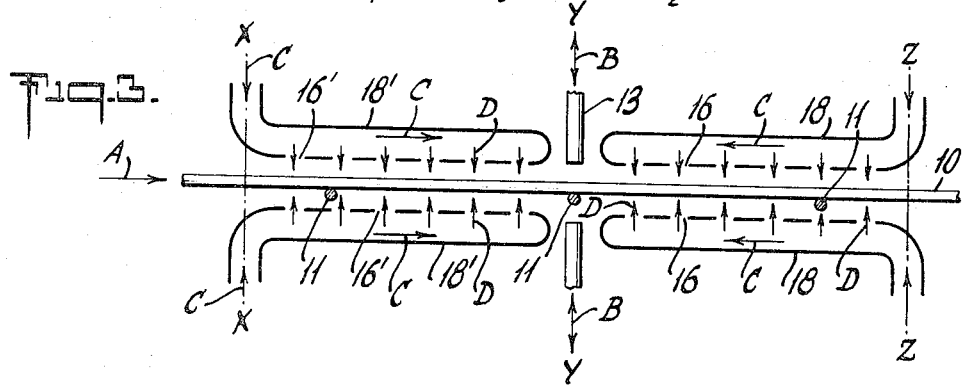
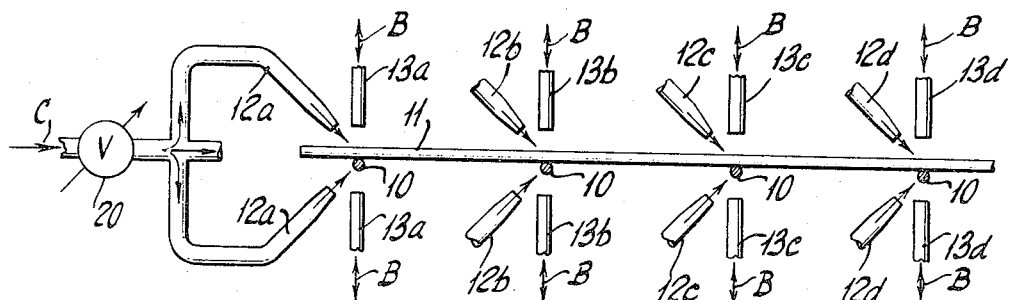

3,539,752
FABRICATION OF STEEL MATS
Walter Ernst, Strump, Post Osterath, Germany, assignor to Bau-Stahlgewebe G.m.b.H., Dusseldorf-Oberkassel, Germany, a corporation of Germany
Filed Aug. 3, 1966, Ser. No. 569,873
Claims priority, application Germany, Aug. 12, 1965, B 83,235
Int. Cl. B23k 9/00; C21d 1/00
U.S. Cl. 219—56
3 Claims

ABSTRACT OF THE DISCLOSURE

In the fabrication of metal mats made up of a plurality of longitudinal and cross bars welded at their intersections by applying the cross bars to the longitudinal bars and feeding the partially welded mats in the direction of the longitudinal bars past any array of spot welding devices, the parts of the bars in the vicinity of the intersections are pre-heated above ambient temperature and passed, after welding, through a heat field having a temperature distribution gradually decreasing, in the feeding direction, from the elevated to ambient temperature.

---

The present invention relates to means for and a method of fabricating steel or the like metal mats, especially of the type used as inserts in reinforced concrete construction and consisting of sets of spaced and intersecting longitudinal and cross bars or rods connected by electric spot welding at their intersection points.

In the fabrication of rectangular steel mats or units of this type, consisting of relatively long longitudinal bars intersected by shorter cross bars, it is customary to connect the bars at their intersection points by electric resistance spot welding by the aid of suitable welding devices enabling the welding of the intersection points along a cross bar by a single operation. Since the known welding devices are normally operated at room or ambient temperature, an excessively high temperature obtains during the instant of welding in the vicinity of the intersecting areas or weld spots of any two crossing adjoining bars, said temperature decreasing relatively rapidly upon termination of the welding operations as a result of the direct contact of the intersections with the surrounding atmosphere. This relatively rapid temperature change or cooling of the welding joints has been found to frequently result in brittle or inferior weld joints and, in turn, in defective and unsatisfactory mats or construction units. Where a single such defective unit is used in a known manner in an assembly comprising a large number of units with their marginal areas in overlapping relation, to produce a composite mat structure of relatively larger size, a single inferior unit will result in the defectiveness of the entire assembly or reinforcing structure.

Accordingly, an important object of the present invention is the provision of a novel method of an apparatus for the spot welding of steel or the like mats of the referred to type by which the foregoing and related defects and difficulties, in particular the production of brittle weld joints, are subtsantially eliminated or minimized.

The invention, both as to the foregoing and ancillary objects, as well as novel aspects thereof, will be better understood from the following detailed description, taken in conjunction with the accompanying drawing forming part of this specification and in which:

FIG. 1 is a schematic cross-sectional view of welding apparatus suitable for the carrying into effect of the improved spot welding method for the production of steel or the like mats or structures in accordance with the invention;

FIG. 2 is a graph explanatory of the function and operation of the invention;

FIG. 3 is a diagrammatic view similar to FIG. 1, showing a modified welding apparatus for the practicing of the invention; and FIG. 4 illustrates still another welding apparatus for the carrying into effect of the invention.

Like reference characters denote like parts in the different views of the drawing.

With the foregoing object in view, the invention involves generally the provision of a novel method of and means for the welding of steel or the like mat structures of the referred to type comprising the steps of pre-heating the bars to be welded in the vicinity of the intersection points to a predetermined temperature above ambient or room temperature, spot welding the bars at said points at elevated temperature, and retarding the cooling of the joints produced to room temperature, to substantially prevent the occurrence of any abrupt or steep temperature changes, prior to and following the welding operations proper.

In other words, according to the present invention the metal at and near the crossing points of the bars to be welded is subjected to a predetermined heating cycle comprised of a first or heating period, to gradually raise the metal to a predetermined temperature above ambient or room temperature, followed by a second or cooling period, to again gradually reduce the temperature to room temperature according to a continuous time function, the actual welding of the bars being effected during the brief interval or transition from said heating to said cooling period. As a consequence, excessive sudden temperature changes or gradients between the weld spot proper and the surrounding metal or atmosphere are substantially eliminated or minimized, thus enabling a gradual re-crystallization of the molten metal and formation of an efficient weld joint substantially devoid of brittleness and other undesirable characteristics.

In carrying into effect the invention, the bars to be welded may be continuously passed through a heating field or space of gradually increasing and subsequently decreasing temperature distribution, the variation of the temperature preferably following a known e-function. For practical purposes, the maximum temperature at which welding is effected may be about 450° C. in the case of steel bars or rods being welded.

As a result of the gradual heating of the bars, or of the metal at the intersecting points, such as by passing the same through a heating field of gradually varying temperature distribution, the metal to be joined is prevented from being subjected to any sudden or steep temperature changes during welding. There is thus ensured the attainment of reliable and efficient weld joints substantially devoid of brittleness and other defects.

The heat required for the pre-heating of the crossing points prior to welding may be supplied by any suitable heating source, such as in the form of a hot air heating aggregate designed and arranged to enable ready operation of the welding devices at the intersection points, on the one hand, as well as the unimpeded feeding of the structures to be welded through or past said devices.

As will be appreciated from the foregoing, an important feature of the invention, aside from the local pre-heating of the bars at and in the vicinity of the crossing points, consists in the weld joints being passed, during the further and continued feeding of the mats, through a heating field or space of gradually decreasing temperature distribution produced by means disposed behind the welding devices as viewed in the feeding direction. In other words, according to this modification for the carrying into effect of the invention, the heating source or sources for the pre-heating of the bars prior to welding, on the one hand, and for the retarded cooling after welding, on the other hand, are stationary and preferably form a unitary structure together with the welding devices, while the mats to be welded are fed continuously and/or step-by-step for the sequential welding of the cross bars to the longitudinal bars, in the manner as will become further apparent as the description proceeds.

The heating field, to effect a gradual cooling of the welding joints, may be derived from the same heat source which serves for the pre-heating of the bars. In such a case, the heat so to speak flows over the crossing points, to heat the same to the desired temperature, and thereafter passes into the heating field or channel.

In such an arrangement, the thermal flux through said channel does not affect the longitudinal bars in the vicinity of the crossing points, but rather at a point following the welding device in the feed direction. By this deviation of the thermal flux, the longitudinal bars will remain sufficiently heated at a certain distance from the welding position. During the feeding of the mats, the heated air is discharged through sieve-like openings or apertures in the heating channels, to act on the passing cross bars, in the manner further described in reference to and shown by the drawing.

Alternatively, it is possible to utilize separate heat sources for the pre-heating of the bars and maintenance of a heating field, to gradually heat and retard, respectively, the cooling of the welding spots. Again, hot air under pressure is advantageously used for this purpose being circulated through suitable heating channels or conduits, in such a manner as to increase the temperature in the direction towards and to decrease it in the direction away from the welding position. There is thus insured a desired maximum temperature in the vicinity of the welding electrodes, being below the melting or recrystallization temperature of the metal, such as about 450° C. in the case of steel bars or rods, as pointed out hereinabove.

In practice, it has been found advisable to provide for an asymptotic rather than a linear temperature variation or decrease of the temperature, that is, following an $e$-function, to ensure a gradual cooling free from sudden or abrupt temperature changes.

Finally, the intersection points may be heated by a single heat source in the form of one or more hot air jets or streams with the intensity thereof being controlled, preferably by means synchronized with the welding operation, to result in the desired heating and cooling cycles and welding during the intervals between the rising and falling temperature periods, in the manner as will become further apparent as the description proceeds in reference to the drawing.

Referring more particularly to FIG. 1, the mat to be welded comprises a plurality of longitudinal bars 10 (only one of which appears in the drawing) intersected by cross bars 11 welded or to be welded, respectively, to the bars 10 at the intersection points. The mat structure is fed in the direction of the longitudinal bars 10, as indicated by the arrow A, past or through a stationary welding and heating device. In the drawing, only a single device is shown for the bar 10 in the position for welding of the left-most cross bar 11, it being understood that similar welding devices (not shown) are provided for the remaining longitudinal bars of the mat for the simultaneous welding of all the intersection points of a single cross bar at a time, in a manner readily understood.

In the embodiment for the carrying into effect of the invention as shown by FIG. 1, the areas at and surrounding the intersection points of the bars are pre-heated to the desired temperature above room or ambient temperature by means of hot air streams or jets applied through a pair of nozzles 12 arranged at right angle to one another and directed towards the crossing or intersection point being welded, as indicated by the arrows C in the drawing. As a consequence, welding of the gradually heated bars by means of a pair of conventional resistance welding electrodes 13, operable in the directions indicated by the double arrows B, occurs above room temperature, such as 450° C. in the referred to example, to thereby avoid sudden or abrupt temperature changes during welding. In order to retard the cooling of the joints being produced, or to ensure a gradual recrystallization of the molten metal, the same heat source is utilized for the production of a heating field or space acting upon the welding joints after passing the welding position or electrodes 13. This is achieved, in the example shown, by causing the air streams C, upon passing or flowing over the intersection point, to pass through a pair of U-shaped heating channels 14 disposed parallel to and on either side of the cross bar 11, the walls of the inner legs of said channels facing the bar 11 being provided with sieve-like apertures 16, to direct the air towards said bar in a plurality of small jets as indicated by the arrows D. The apertures 16 are so designed as to provide a heating field or space effective on said bar or welding joint of gradually decreasing temperature in the direction away from the welding position as viewed in the feed direction A. If desirable, the air may be re-heated by the provision of suitable auxiliary heating means, such an additional hot air stream being passed through the space 15 between the U-legs of the channels 14.

In an arrangement of the foregoing type, if the intensity of the jets or streams C is such as to result in a continuous or uninterrupted flow through the channels 14 and out of the apertures 16, the resultant temperature distribution or decay may be sufficient to provide for the required retardation of the cooling of the welding joints to room temperature to prevent brittleness and other defects of the joints. By the provision for a staggered or gradual increase of the diameter of the apertures 16 in the direction towards the welding position or the electrodes 13, the temperature distribution may be controlled to suit any existing conditions or requirement. The latter procedure may be of special advantage where the intensity of the streams C is such as to result in a temporary air storage within the channels 14 prior to the discharge by the apertures 16.

As is understood, the welding devices and heating apparatus of FIG. 1 may be in the form of separate units or preferably combined into a unitary structure by the casings or channels 14 providing a support for the electrodes 13, as indicated schematically at $y$-$z$ in the drawing.

The mat being welded may be fed continuously at a proper speed and welding effected by the operation of the welding electrodes 13 at the instant of an intersection point of the bars passing the welding position. If desired, the mat may be briefly arrested in the welding position, to suit existing operating conditions or requirements.

FIG. 2 illustrates the preferred temperature cycle or variation substantially following an $e$-function before (ascending branch $a$) and after welding (descending branch $b$), welding by the electrodes 13 being effected at the instant of the cycle which starts at $t_1$ and ends at $t_2$. $T_m$ represents the maximum pre-heating temperature, that is, about 450° C. in the example mentioned, while $T_R$ represents room temperature.

According to the modification shown by FIG. 3, two sets of heating channels or conduits 18' and 18 are provided arranged in back-to-back relation to the welding device, to produce a pair of leading and lagging heating fields, in respect to the feeding direction, of increasing and decreasing temperature distribution, respectively, as indicated at $x$-$y$-$z$ in the drawing, to again result in a heating cycle of the intersection points as shown by FIG. 2 during passage through the device in the direction of the arrow A.

Finally, in the FIG. 4 modification according to which the longitudinal bars 10 are fed step-by-step at right angle to the cross bar 11 or to plane of the drawing, the welding electrodes 13a–13d for the simultaneous welding of all the longitudinal bars 10 of a mat to a common cross bar 11 are all connected to a hot air supply or stream by way of nozzles 12a–12d, respectively, said stream being periodically controlled in intensity by a valve or the like control device 20, to again result in a heating cycle of the intersection points as shown by FIG. 2. In this case, the operation of the welding electrodes 13a–13d is advantageously synchronized both with the operation of valve 20 and the feeding mechanism for the mat 10, 11, to result in automatic welding of the mat in a manner readily understood.

In the foregoing the invention has been described in reference to specific illustrative devices. It will be evident, however, that variations and modifications, as well as the substitution of equivalent parts or devices for those shown herein for illustration, may be made in accordance with the broader purview and spirit of the invention. The specification and drawing are accordingly to be regarded in an illustrative rather than a restrictive sense.

I claim:

1. Apparatus for the electric spot welding of a mat structure made up of sets of mutually spaced and intersecting steel bars comprising first heating means to raise said bars in the vicinity of an intersection to be welded to an elevated temperature substantially in excess of ambient temperature, electric spot welding means to weld said bars at said intersection while at said elevated temperature, and further means independent of said first heating and said welding means and adjoining said welding means, to maintain a heat field having a temperature distribution along a predetermined path gradually decreasing from said elevated to ambient temperature, to effect cooling of the welded intersection to ambient temperature by passing through said field along said path.

2. In welding apparatus for the spot welding of a mat structure according to claim 1, wherein said structure is fed with the intersections to be welded being moved towards and into relative operative position to and past said welding means, said heating means being comprised of at least one hot air heater applying a stream of hot air under pressure to the intersection to be welded, and said further means being comprised of means to direct the air upon flowing over said intersection to establish a heating field of gradually decreasing temperature distribution traversed by said intersection upon passing said welding means.

3. Apparatus for the spot welding of mat structures according to claim 1, wherein said structure is fed with the intersections to be welded being moved into relative operative position to and past said welding means, said heating and further means being each comprised of means providing a hot air heating space adjoining the path of said intersections preceding and following, respectively, said welding means, to gradually heat and cool an intersection prior to and after welding, respectively.

References Cited

UNITED STATES PATENTS

| | | | |
|---|---|---|---|
| 1,287,376 | 12/1918 | MacLennan | 219—91 |
| 1,889,780 | 12/1932 | Frickey | 29—488 |
| 2,262,705 | 11/1941 | Tuttle | 219—91 |
| 2,363,719 | 11/1944 | Cooper et al. | 219—91 |
| 2,422,829 | 6/1947 | Fotie | 219—56 |
| 3,317,703 | 5/1967 | Gilbert | 219—110 |
| 1,298,590 | 3/1919 | Smith | 219—124 |
| 1,542,753 | 6/1925 | Wittsie | 219—137 X |

JOSEPH V. TRUHE, Primary Examiner

L. A. SCHUTZMAN, Assistant Examiner

U.S. Cl. X.R.

28—497; 148—127; 219—58, 61, 124